United States Patent
Simnacher

(10) Patent No.: US 9,233,374 B1
(45) Date of Patent: Jan. 12, 2016

(54) APPARATUS FOR SHREDDING AND SCANNING OF RECEIPTS

(71) Applicant: Larry W. Simnacher, Bay City, TX (US)

(72) Inventor: Larry W. Simnacher, Bay City, TX (US)

( * ) Notice: Subject to any disclaimer, the term of this patent is extended or adjusted under 35 U.S.C. 154(b) by 0 days.

(21) Appl. No.: 14/549,799

(22) Filed: Nov. 21, 2014

(51) Int. Cl.
G06K 5/00 (2006.01)
B02C 18/00 (2006.01)
B02C 18/22 (2006.01)
H04N 1/00 (2006.01)

(52) U.S. Cl.
CPC ......... *B02C 18/0007* (2013.01); *B02C 18/2283* (2013.01); *H04N 1/0032* (2013.01); *H04N 1/00567* (2013.01); *B02C 2018/2208* (2013.01); *H04N 2201/0081* (2013.01); *H04N 2201/0096* (2013.01)

(58) Field of Classification Search
CPC ............. B02C 18/0007; H04N 1/4473; G06K 15/403; G03G 2215/00691
See application file for complete search history.

(56) References Cited

U.S. PATENT DOCUMENTS

| | | | | |
|---|---|---|---|---|
| 4,869,435 A | * | 9/1989 | Pistorius et al. | 241/100 |
| 5,128,520 A | * | 7/1992 | Rando et al. | 235/375 |
| D329,055 S | * | 9/1992 | Krause et al. | D18/34.5 |
| 5,829,690 A | * | 11/1998 | Deschamps | 241/36 |
| 5,926,550 A | | 7/1999 | Davis | |
| 5,961,059 A | * | 10/1999 | Kroger | 241/236 |
| 6,115,241 A | * | 9/2000 | Hu | 361/679.26 |
| 6,397,194 B1 | | 5/2002 | Houvener et al. | |
| 6,533,168 B1 | | 3/2003 | Ching | |
| 6,891,979 B2 | * | 5/2005 | Hu et al. | 382/313 |
| 7,069,240 B2 | | 6/2006 | Spero et al. | |
| 7,746,510 B2 | | 6/2010 | Pandipati | |
| 8,090,615 B1 | * | 1/2012 | Cunningham et al. | 705/14.27 |
| 8,285,604 B1 | | 10/2012 | Trandal et al. | |
| 8,693,070 B2 | | 4/2014 | Pandipati | |
| 2004/0117250 A1 | * | 6/2004 | Lubow et al. | 705/14 |
| 2005/0002053 A1 | * | 1/2005 | Meador et al. | 358/1.14 |
| 2005/0253005 A1 | * | 11/2005 | Watanabe | 241/169.1 |
| 2006/0250662 A1 | * | 11/2006 | Heit | 358/474 |
| 2007/0019244 A1 | * | 1/2007 | Rekiere | 358/3.28 |
| 2007/0057099 A1 | * | 3/2007 | Kubo et al. | 241/101.2 |
| 2007/0075168 A1 | * | 4/2007 | Rodriguez et al. | 241/36 |
| 2009/0078806 A1 | * | 3/2009 | Adachi et al. | 241/34 |
| 2009/0141318 A1 | * | 6/2009 | Hughes | 358/498 |
| 2009/0257101 A1 | * | 10/2009 | Gurak | 358/498 |
| 2010/0044482 A1 | * | 2/2010 | Hirasuga et al. | 241/34 |
| 2011/0137770 A1 | | 6/2011 | Glasco | |
| 2014/0188647 A1 | | 7/2014 | Argue et al. | |

FOREIGN PATENT DOCUMENTS

WO    WO 03086922 A1 * 10/2003

OTHER PUBLICATIONS

"PlanOn 'SlimScan SS100' Receipt Organization Made Easy" (2009), http://planon.com/slimscan.php, accessed on Aug. 4, 2015.*

* cited by examiner

*Primary Examiner* — Thien M Le
*Assistant Examiner* — Claude J Brown
(74) *Attorney, Agent, or Firm* — Egbert Law Offices, PLLC

(57) ABSTRACT

An apparatus for the shredding and scanning of receipts has a housing with an inlet opening and an outlet opening, a feeding mechanism positioned in the housing, and at least one blade positioned in the housing adjacent to the feeding mechanism. The feeding mechanism is suitable for drawing the receipt through an interior of the housing. The blade is suitable for cutting the receipt. The feeding mechanism serves to pass the cut receipt through the outlet opening. A scanner is positioned adjacent to the inlet opening so as to read information on the receipt prior to the receipt encountering the blade.

12 Claims, 4 Drawing Sheets

APPARATUS FOR SHREDDING AND SCANNING OF RECEIPTS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to paper shredding mechanisms. Additionally, the present invention relates to apparatus for the scanning of information on receipts. More particularly, the present invention relates to apparatus that both scan information on receipts and shred the receipt subsequent to scanning.

2. Description of Related Art Including Information Disclosed Under 37 CFR 1.97 and 37 CFR 1.98

Receipts are commonly provided following the payment for goods and/or services. Typically, the receipt is printed onto a very small piece of paper. It is known that the ink that is used for the printing of receipts can often be toxic to the skin. The fumes from such printing fluids can produce toxic effect to those in proximity to the receipt. As such, it is important to remove the receipt, as soon as possible, from contact with a body or clothing of the person that has received the receipt.

Throughout normal commerce, persons will typically accumulate a wide variety of receipts. Typically, these receipts will be folded or accumulated with in a pocket. Over time, the ink will fade and the information will no longer remain in a visible form upon the receipt. It is often difficult to organize the receipts so that later recording of information from the receipts can be obtained. Additionally, a typical person may accumulate a wide jumble of receipts. The accumulation of such a large number of receipts will tend to discourage efforts by the person that receives the receipt to record the information from the receipts. As such, need has developed whereby the information on the receipt can be immediately secured and that the receipt can be immediately shredded and/or discarded.

Shredding mechanisms are known in the past. The shredding mechanisms are typically used in an office or commercial environment for the shredding of large pieces of paper. Typically, a large number of such pieces of paper are placed within the shredder. As such, the shredder will have a relatively large housing and a wide variety of blades and shredding mechanisms therein so that the large pieces of paper can ultimately be shredded. After the shredding, the information on these large pieces of paper would no longer be available for use by others. Unfortunately, it is very difficult to transport such shredders. Such shredders would seldom, if ever, be conveniently available in order to shred small receipts obtained during a normal day of commercial transactions. As such, a need has developed so as to provide a very compact shredder that can be available for the immediate shredding of receipts.

In the past, various patents have issued relating to scanners for the scanning of information on receipts. For example, U.S. Pat. No. 5,926,550, issued on Jul. 20, 1999 to D. L. Davis, shows a scanner that is constructed to prevent illicit post-scan modification of a data set. The data set is a representation of visual images printed on a document scanned by the scanner. To prevent illicit post-scan modification, the scanner produces a digital signature which is output in combination with the data set.

U.S. Pat. No. 6,397,194, issued on May 28, 2002 to Houvener et al., shows a receipt scanning system and method. This transaction data processing system is especially configured to capture, store and retrieve transaction data, including a digital representation of a signature of a person initiating a transaction. The transaction data processing system includes a scanner located at a point of use location. The scanner is configured to scan a transaction document including the signature of at least one party to the transaction. A transaction data processor is also included for processing the scanned transaction data and for generating a transaction data record. A communication link will link the remote database site to the transaction data processor, which is located at the point of use location.

U.S. Pat. No. 6,533,168, issued on Mar. 18, 2003 to T. N. Ching, shows an information entry and reporting system and a method for tracking data associated with retail transactions at the point-of-sale. Transaction data is converted into a machine-readable data form pattern and printed onto a sales receipt provided to the purchaser. Subsequently, the purchaser uses a suitably configured scanning device to read the data form pattern into his or her computer. Software algorithms decode the scanned data form pattern, extract the debt transaction data, and store for subsequent analysis and reporting.

U.S. Pat. No. 7,069,240, issued on Jun. 27, 2006 to Spero et al., describes a system and method for capture, storage and processing of receipts. The system includes an image capture device, such as a scanner or digital camera connected to a computer processor that is able to capture and store images. The computer processor analyzes the images of the receipts, converts the images to text, analyzes the data, extracts expense data, and puts the data into an expense report. The end user can review the captured expense data, correct it or add to it. The system displays the image of the receipt side-by-side with the captured expense data to make review and editing easier.

U.S. Pat. No. 7,746,510, issued on Jun. 29, 2010 the R. K. C. Pandipat, teaches a receipt scanner and financial organizer. The system includes a scanner, an apparatus for scanning receipts into a computer, and a unique software program which automatically processes, organizes and saves expense information that can be viewed in various formats. The scanner accommodates paper of differing sizes. The scanner is used to input bills, receipts, and bank statements. The scanner is connected to a computer through a Universal Serial Bus or a parallel port. The software program creates a text file of the scanned data by inclusion of sorting, categories, etc., and automatically saves the information in a Quicken Interchange Format so as to allow it to be imported into any financial management software for further processing.

U.S. Pat. No. 8,285,604, issued on Oct. 9, 2012 to Trandal et al., provides a method and system for receipt management and price comparison. In particular, the system maintains purchase records, creates shopping lists, and comparison pricing.

U.S. Pat. No. 8,693,070, issued on Apr. 8, 2014 to R. K. C. Pandipati, describes a portable device that is configured to obtain an image of a document. The document is of no predefined format. The document also contains numerical data. The numerical data is extracted and automatically organized into a report in a predefined or customized format and stored into a database. The database is accessible and searchable by a user to obtain either the numerical data of the image or the report.

U.S. Patent Publication No. 2011/0137770, published on Jun. 9, 2011 the V. Glasco, teaches an electronic checkbook for recording and monitoring transactions. The electronic checkbook includes a booklet of checks in which the checks are positioned in the lower half of the checkbook. An electronic device is provided so as to store, record and scan receipts. It also serves to record transactions related to a plurality of accounts and to display data related to the transactions and the plurality of accounts. The mechanism to scan receipts also includes a pin scanner connected to the electronic device.

U.S. Patent Publication No. 2014/0188647, published on Jun. 3, 2014 to Argue et al., discloses the a process for searching digital receipts at a mobile device. A customer mobile device receives and stores one or more digital receipts. The digital receipts correspond to transactions conducted with a merchant. A user captures an image from the item. Search criteria are derived from the captured image. The search criteria are used to search digital receipts stored at the customer mobile device.

It is an object of the present invention to provide an apparatus that facilitates the ability to scan and shred receipts.

It is another object of the present invention to provide an apparatus that is very compact.

It is another object of the present invention to provide an apparatus that any effectively avoids issues associated with the use of toxic ink on receipts.

It is a further object of the present invention provide an apparatus which facilitates the ability to store information from the receipts.

It is still a further object of the present invention to provide an apparatus that can be effectively placed within a conventional wallet.

It is still a further object of the present invention provide an apparatus which effectively shreds valuable information from receipts.

These and other objects and advantages of the present invention will become apparent from a reading of the attached specification and appended claims.

BRIEF SUMMARY OF THE INVENTION

The present invention is an apparatus for the scanning and shredding of receipts. The apparatus includes a housing having an inlet opening and an outlet opening, a feeding mechanism positioned in the housing, and at least one blade positioned in the housing adjacent to the feeding mechanism. The feeding mechanism is suitable for drawing the receipt through an interior of the housing. The blade is suitable for cutting the receipt. The feeding mechanism serves to pass the cut receipt through the outlet opening.

In the present invention, the housing has a generally cylindrical configuration. The inlet opening is formed at the top of the housing. The outlet opening is formed at a bottom of the housing. The housing has a flange extending outwardly of the generally cylindrical configuration. This flange is directed toward the inlet opening.

The feeding mechanism includes a shaft extending through the interior of the housing and a plurality of arms extending radially outwardly of the shaft so as to be directed toward an interior wall of the housing. A plurality of contact elements are respectively positioned at the ends of the plurality of arms. Each of the plurality of contact elements is of a polymeric material or of an elastomeric material.

A motor is operatively connected to the shaft so as to rotate the shaft within the housing. A battery is connected to the motor so as to supply power to the motor. The motor and the battery are positioned in the housing.

The blade includes a plurality of blades positioned in the housing. The plurality of blades extend toward the feeding mechanism. The plurality of blades are affixed to an inner wall of the housing and extend inwardly therefrom. The plurality of blades are in spaced relationship to each other. Each of the plurality of arms has an end opposite to the shaft that is positioned between adjacent blades of the plurality of blades. In an embodiment of the present invention, the plurality of blades are arranged in spaced relation around an inner diameter of the inner wall of the housing.

In the present invention, a scanner is positioned adjacent to the inlet opening. The scanner is suitable for reading information on the receipt prior to the receipt entering or encountering the blades. Additionally, the present invention can further include a wallet that has an inner surface. The housing is affixed to the inner surface of the wallet.

This foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
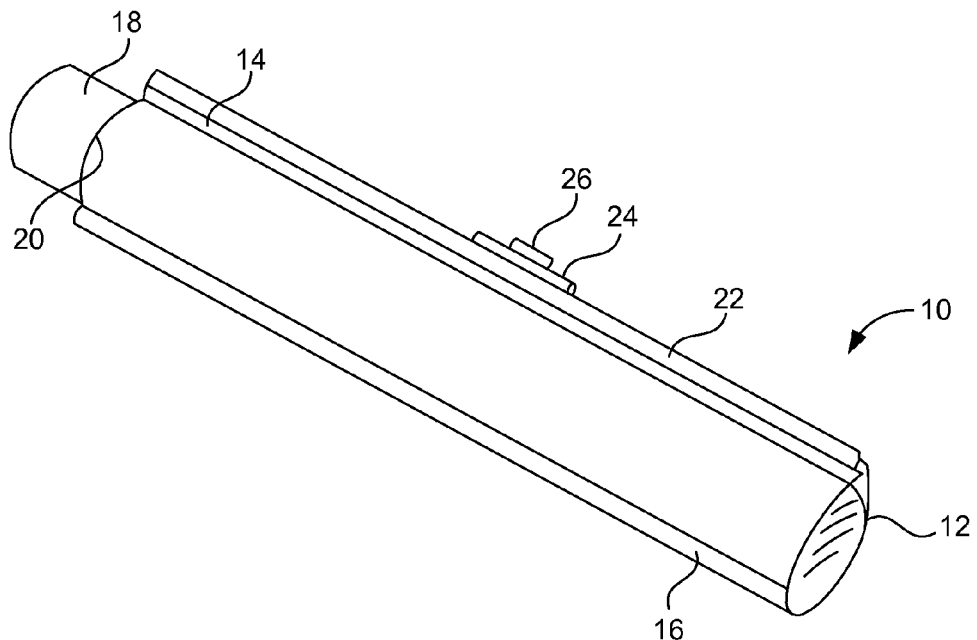
FIG. 1 is an upper perspective view showing the apparatus of the present invention.

FIG. 1 shows the apparatus 10 for the scanning and shredding of receipts in accordance with the preferred embodiment of the present invention. In FIG. 1, the apparatus 10 includes a housing 12. The housing 12 includes an inlet opening 14 and an outlet opening 16. The inlet opening 14 is located at the top of the housing 12. The outlet opening 16 is located at the bottom of the housing. A motor 18 is affixed to the end 20 of the housing 12. As will be described hereinafter, the motor 18 is suitable for causing the rotation of a shaft within the interior of the housing 12.

The housing 12 is illustrated as having a generally cylindrical configuration. A flange 22 extends outwardly of the generally cylindrical configuration of the housing 12. Flange 22 is generally positioned adjacent to the inlet opening 14. As such, the flange 22 provides a guide surface whereby the end of the receipt can be easily inserted into the inlet opening 14 in a straight manner. The flange 22 can further include a scanning bar located on an interior thereof. The scanning bar will be positioned forward of the inlet opening 14. A suitable processor 24 is a fixed to the outer side of the flange 22. The processor 24 can include a suitable connector 26 whereby information secured by the processor 24 can be downloaded to a computer or other data processing device. As a result of this configuration, when the edge of the receipt is inserted into the inlet opening 14, the scanning bar located on the flange 22 will retrieve information from the receipt as it is being fed into the inlet opening 14 and through the interior of the housing 12. The scanned information can then be stored for later processing.

Ultimately, as will be described hereinafter, the apparatus 10 includes a unique interior configuration whereby the receipt that is inserted into the interior opening 14 is effectively shredded. The shredded portions of the receipt can then be discharged through the outlet opening 16.

Figure 2:
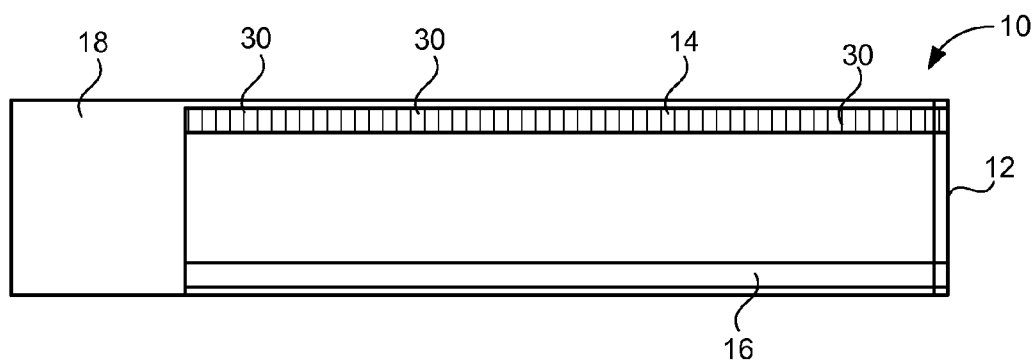
FIG. 2 is a frontal view showing the apparatus of the present invention.
Figure 3:
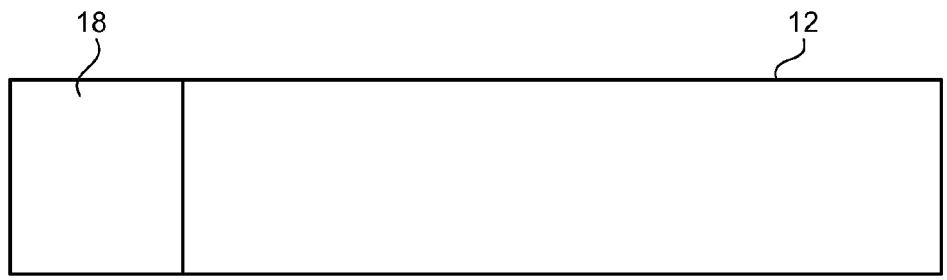
FIG. 3 is a plan view showing the apparatus the present invention.

FIG. 2 shows a frontal view of the housing 12 of the apparatus 10. In particular, FIG. 2 shows that the inlet opening 14 is located at the top of the housing 12 and the outlet opening 16 is located at the bottom of the housing 12. A plurality of blades 30 are arranged so as to extend within the interior of the housing 12. As a result, when the receipt is introduced into the inlet opening 14, the blades 30 will serve to cut the receipt. Ultimately, the cut receipt will be discharged through the outlet opening 16. The motor 18 is located at one end of the housing 12 and can be contained within the same housing 12 as the feeding mechanism (to be described hereinafter). FIG. 3 illustrates this configuration of the housing where the motor 18 will be contained within the polymeric material used for the formation of the housing 12.

Figure 4:
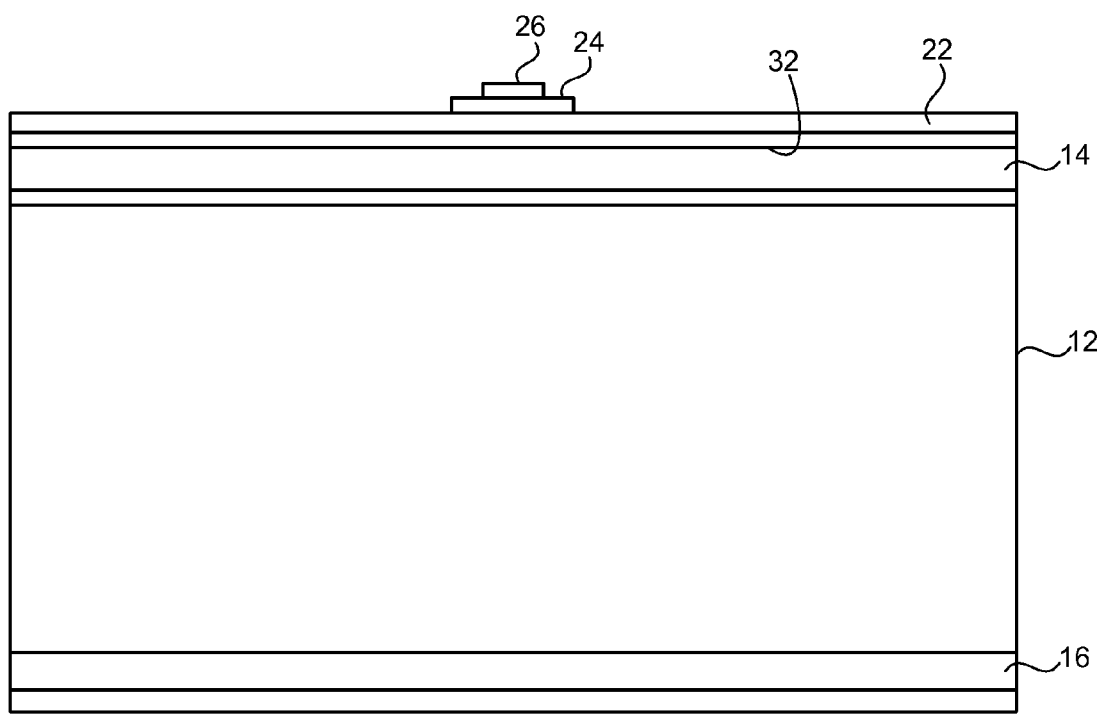
FIG. 4 is a detailed view showing a frontal portion of the apparatus of the present invention.

FIG. 4, shows in particular, the frontal configuration of the housing 12 showing the inlet opening 14 and the outlet opening 16. The flange 22 is illustrated as extending outwardly from the top of the housing 12 adjacent to the inlet opening 14. The scanner bar 32 is affixed to the lower surface of the flange 22 so as to be directed toward the inlet opening 14. The scanner bar 32 extends substantially for the length of the inlet opening 14 so as to achieve a complete scan of any receipt that would be passing into the interior of the housing 12. The processor 24 is electrically connected to the scanner bar 32. The processor 24 also includes a connector 26 extending therefrom.

FIG. 4 illustrates the interior configuration of the apparatus 10 of the present invention. In FIG. 4, it can be seen that the motor 18 is located at one end of the housing 12. A battery 40 is operatively connected to the motor 18 so as to supply power thereto. The motor 18 is connected to a shaft 42. Shaft 42 extends through the interior 44 of the housing 12. The shaft 42 can be supported within the interior 44 of the housing 12 through the use of suitable bearings.

Figure 5:
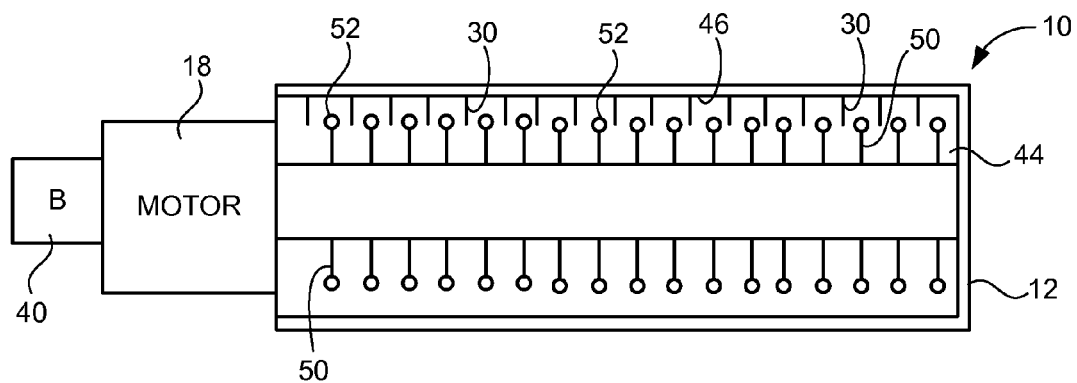
FIG. 5 is a cross-sectional view showing the interior of the apparatus of the present invention.

Importantly, in FIG. 5, it can be seen that the plurality of blades 30 are affixed to an inner wall 46 of the housing 12. The blades 46 are generally positioned in an area adjacent to the inlet opening 14. The blades 30 extend downwardly in generally spaced parallel relationship to each other. The blades 30 project in a direction toward the shaft 42. The length of each of the blades 30 can be adapted to the desired shredding ability of the apparatus 10.

In FIG. 5, there are a plurality of arms 50 that project radially outwardly from the shaft 42. The arms 50 extend in generally parallel relationship to each other. The arms 50 include a contact elements 52 formed at an end thereof opposite the shaft 42. The contact elements 52 can be in the nature of a small glob of polymeric or elastomeric material. The use of the contact element 32 achieves a bit of releasable contact adhesion between the surface of the receipt and the arm 50. As such, as the shaft 42 rotates and as the arms 50 rotate with the shaft 42, the contact elements 52 will cooperate with the receipt so as to draw the receipt across the blades 30 for the effective shredding of the receipt. The arms 50, in conjunction with the contact elements 52, further serve to convey the receipt through the interior 44 of the housing 12. Ultimately, the continued rotation of the shaft 42 will cause the shredded receipt to be discharge through the outlet opening 16.

FIG. 5 shows that the contact elements 52 or the end of the arms 50 are located generally between adjacent blades 30. As such, this serves to urge the receipt into forced close contact with the blades 30. As a result, in conjunction with the conveying of the receipt through the interior 44 of the housing 12, the arms 50, along with the contact elements 52, further serves to exert force upon the receipt so as to effectively cause the shredding of the receipt the receipt.

In the present invention, it is known that the receipt is of a very thin and flimsy material. Typically, such receipts would deform in such a way to make shredding somewhat difficult. However, experiments with the present invention have shown that the forced entry of the contact elements 52 in conjunction with the receipt, along with the blades 30 will effectively cause the shredding of such a thin and flimsy receipts. A large number of such arms 50 further extends across the entire surface of the receipt so as to effectively assure that the entire receipt is effectively shredded. As result, any information on the receipt is effectively destroyed.

Figure 6:
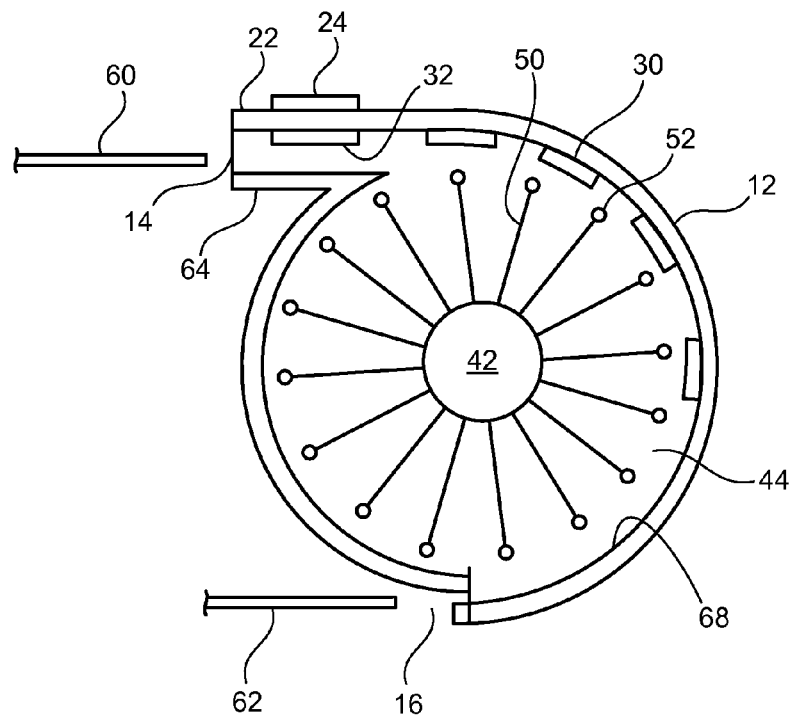
FIG. 6 is a cross-sectional end view showing the interior of the apparatus the present invention.

FIG. 6 shows, in particular, how the receipt 60 is introduced into the inlet opening 14 and how the shredded receipt 62 is discharged through the outlet opening 16. The receipt 60 is initially introduced into the inlet opening 14 defined by the flange 22 and an inner wall 64. The receipt 60 will initially pass by the scanner bar 32. As a result, the information on the receipt 60 can be retained by the processor 24 and transmitted for use elsewhere. Subsequent to passing the scanner bar 32, the receipt 60 is pushed, by hand, into the interior 44 of the housing 12. When the receipt 60 is pushed by hand far enough, the contact elements 52 at the end of the arms 50 will contact the receipt 60 so as to draw the receipt across the blades 30. This will cause the effect shredding of the receipt. Ultimately, the contact elements 52, in conjunction with the arms 50 and the rotatable shaft 42, will serve to convey the shredded receipt 62 along the inner wall 68 of the housing 12 and outwardly through the outlet opening 16. The shredded receipt 62 can then be discharged, as required.

In FIG. 6, it can be seen that there are a plurality of arms 50 that extend radially outwardly of the shaft 42 in a common plane. Within the concept of the present invention, these arms 50 can be effectively staggered along the length of the shaft 42. Additionally, in FIG. 6, it can be seen that there are a plurality of blades 30 that extend inwardly from the inner wall 68 of the housing 12. The blades 30 are arranged in spaced relationship to each other along the inner diameter of the inner wall 68 of the housing 12. This spaced relationship of each of the blades 30 have been found further to effectively shred and/or macerate the receipt. The receipt will initially encounter the closest blade, past through a space between that blade and the adjacent blade, and then be cut by the next blade. This staged arrangement of blades has been found to effectively cause the receipt to be effectively shredded even as the receipt attempts to conform to the movement along the inner wall 68 of the housing 12.

Figure 7:
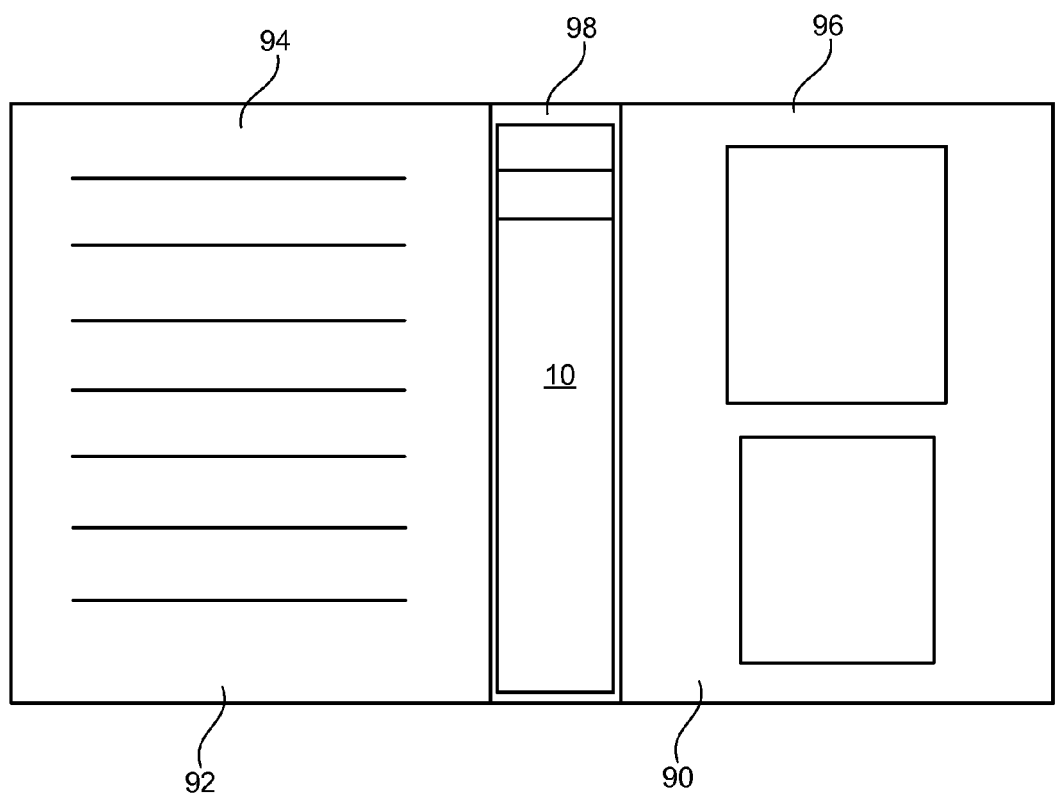
FIG. 7 is a plan view showing the apparatus of the present invention as applied to the inner surface of a wallet.

Importantly, the scanning and shredding apparatus 10 of the present invention is extremely compact. As such, FIG. 7 shows how the scanning and shredding apparatus 10 can be applied to an inner surface 90 of a wallet 92. In FIG. 7, it can be seen that the wallet 92 includes a first side 94, a second side 96, and a central hinging area 98. The apparatus 10 can be applied within this hinging area 98. As a result, the receipts can be accumulated within the wallet 92. After a sufficient number of receipts have been accumulated, they can be scanned and shredded by the apparatus that has been mounted to the inner surface 90 of the wallet 92. As such, the scanning and shredding apparatus 10 of the present invention can be effectively and conveniently transported easily by the user.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for shredding of a receipt, the apparatus comprising:
   a housing having an inlet opening and an outlet opening;
   a feeding mechanism positioned in said housing, said feeding mechanism adapted to drawing the receipt through an interior of said housing, said feeding mechanism comprising:
      a shaft extending through said interior of said housing;
      a plurality of arms extending radially outwardly of said shaft so as to be directed toward an interior wall of said housing; and
      a plurality of contact elements respectively positioned at ends of said plurality of arms opposite said shaft, each of said plurality of contact elements comprising a polymeric material or an elastomeric material; and
   at least one blade positioned in said housing adjacent to said feeding mechanism, the blade adapted to cut the receipt, said feeding mechanism adapted to pass the cut receipt through said outlet opening, said at least one blade comprising:
      a plurality of blades affixed to an inner wall of said housing and extending inwardly toward said feeding mechanism, said plurality of blades being in spaced parallel relationship to each other, said plurality of contact elements extending outwardly into a space between adjacent pairs of blades of said plurality of blades.

2. The apparatus of claim 1, said housing having a generally cylindrical configuration, said inlet opening formed at the top of said housing, said outlet opening formed at a bottom of said housing.

3. The apparatus of claim 2, said housing having a flange extending outwardly of the generally cylindrical configuration, said flange being directed toward said inlet opening.

4. The apparatus of claim 1, further comprising:
   a motor operatively connected to said shaft so as to rotate said shaft within said housing.

5. The apparatus of claim 4, further comprising:
   a battery connected to said motor so as to supply power to said motor.

6. The apparatus of claim 5, said motor and said battery positioned in said housing.

7. The apparatus of claim 1, said plurality of blades arranged in spaced relation to each other around an inner diameter of said inner wall of said housing.

8. The apparatus of claim 1, further comprising:
   a scanner positioned adjacent said inlet opening, said scanner suitable for reading information on the receipt prior to the receipt encountering the blade.

9. The apparatus claim 1, further comprising:
   a wallet having an inner surface, said housing affixed to said inner surface of said wallet.

10. An apparatus for the scanning and shredding of a receipt, the apparatus comprising:
    a housing having an inlet opening and an outlet opening;
    a feeding mechanism positioned in said housing, said feeding mechanism suitable for drawing the receipt through an interior of said housing;
    at least one blade positioned in said housing adjacent to said feeding mechanism, said blade suitable for cutting the receipt, said feeding mechanism suitable for passing the cut receipt through said outlet opening, said at least one blade comprising:
       a plurality of blades positioned in said housing, said plurality of blades extending toward said feeding mechanism, said plurality of blades affixed to an inner wall of said housing and extending inwardly therefrom, said plurality of blades being in spaced relationship to each other;
    a scanner positioned adjacent said inlet opening, said scanner suitable for reading information on the receipt prior to the receipt encountering the blade; and
    a wallet having an inner surface, said housing affixed to said inner surface of said wallet.

11. The apparatus of claim 10, said feeding mechanism comprising:
    a shaft extending through said interior of said housing; and
    a plurality of arms extending radially outwardly of said shaft so as to be directed toward an interior wall of said housing.

12. The apparatus of claim 11, said feeding mechanism further comprising:
    a plurality of contact elements respectively positioned at ends of said plurality of arms.

* * * * *